United States Patent
Miller et al.

(10) Patent No.: US 7,001,036 B2
(45) Date of Patent: Feb. 21, 2006

(54) ELECTROLUMINESCENT ILLUMINATION FOR A MAGNETIC COMPASS

(75) Inventors: Carroll Miller, Reaford, NC (US); Andrew Wilson, Palm Harbor, FL (US)

(73) Assignee: Universal Plastics Products, Inc., Jamestown, NC (US)

( * ) Notice: Subject to any disclaimer, the term of this patent is extended or adjusted under 35 U.S.C. 154(b) by 0 days.

(21) Appl. No.: 10/844,886

(22) Filed: May 13, 2004

(65) Prior Publication Data
US 2004/0228116 A1 Nov. 18, 2004

Related U.S. Application Data

(60) Provisional application No. 60/470,132, filed on May 13, 2003.

(51) Int. Cl.
*F21V 9/16* (2006.01)
(52) U.S. Cl. .................. 362/84; 362/109; 362/253
(58) Field of Classification Search ............ 362/84, 362/109, 253, 458; 702/92, 93; 324/244–260
See application file for complete search history.

(56) References Cited

U.S. PATENT DOCUMENTS

| | | | |
|---|---|---|---|
| 3,828,611 A * | 8/1974 | Shamlian et al. | 73/300 |
| 4,181,925 A * | 1/1980 | Burrows et al. | 362/29 |
| 5,736,973 A | 4/1998 | Godfrey et al. | |
| 5,746,501 A * | 5/1998 | Chien | 362/103 |
| 6,017,127 A | 1/2000 | Kurple | |
| 6,064,158 A | 5/2000 | Kishita et al. | |
| 6,145,209 A | 11/2000 | Chang | |
| 6,366,026 B1 | 4/2002 | Saito et al. | |
| 6,541,921 B1 | 4/2003 | Luciano, Jr. et al. | |
| 6,578,277 B1 | 6/2003 | Chang | |

FOREIGN PATENT DOCUMENTS

JP           01272234           10/2001

OTHER PUBLICATIONS

Merriam-Webster's Collegiate Dictionary, 10th ed., pp. 414-415.*

* cited by examiner

Primary Examiner—Sandra O'Shea
Assistant Examiner—Sharon Payne
(74) Attorney, Agent, or Firm—Charles W. Calkins; Kilpatrick Stockton LLP

(57) ABSTRACT

An illumination device for a magnetically sensitive instrument comprising a magnetically sensitive instrument, preferably a magnetic compass needle, and an electroluminescent device comprising an electroluminescent panel positioned behind and facing the magnetically sensitive instrument such that when the electroluminescent panel is activated, the magnetically sensitive instrument is illuminates by the electroluminescent light. The device is powered by a battery and further comprises a driver circuit to control the electroluminescent panel and switching means to engage and disengage the battery for selective operation of the light source.

11 Claims, 3 Drawing Sheets

_ELECTROLUMINESCENT ILLUMINATION FOR A MAGNETIC COMPASS_

CROSS REFERENCE TO RELATED APPLICATIONS

The present application claims priority under 35 U.S.C. § 119(e) from U.S. Provisional Patent Application Ser. No. 60/470,132, filed May 13, 2003, entitled "Electroluminescent Backlight for Magnetic Compass", the disclosure of which is incorporated herein by reference.

FIELD OF THE INVENTION

This invention relates to an electroluminescent panel incorporated into a magnetically sensitive instrument so as to provide illumination without interfering with the instrument's ability to sense a magnetic field. More particularly, this invention relates to an electroluminescent panel used to provide backlight for a compass.

BACKGROUND OF THE INVENTION

A magnetic compass is an instrument containing a freely suspended magnetic element which displays the direction of the horizontal component of the Earth's magnetic field at the point of observation. The principle concept of a magnetic compass dates back to the Chinese Qin Dynasty (221–206 B.C.) when fortunetellers observed lodestones (iron oxide) would align themselves in a north/south orientation. This phenomenon was later employed to determine orientation with respect to cardinal points and stellar constellations. In later years, compasses proved to be valuable navigational aids for ocean-going ships. In modern times, even with the advent of precise navigational instruments, such as a Global Positioning System (GPS), the magnetic compass remains an invaluable tool. Whether military, explorer, or recreational outdoorsman, the simple magnetic compass provides direction and comfort to a person in an unfamiliar territory.

Magnetically sensitive instruments, such as a compass, must be housed or mounted in such a way as to prevent magnetically active components, for example screws or other metallic components, from interfering with the sensitive compass needle. The amount of magnetic interference generally increases with the size and proximity of a metallic part to the compass needle. This problem has largely been resolved through the use of plastics as housing for magnetically sensitive instruments. For example, compasses can be housed entirely within a plastic case and either mounted a distance away from any metallic object, or in the case of a hand-held compass, be held away from metallic objects.

Often one wishes to provide light to enhance the readability of a magnetic compass in low light conditions. A hand held compass is often used in dense forests or jungles, or in caves where ambient light, particularly at night, is not sufficient to see the needle. There have been many attempts in the prior art to provide illumination for a compass. However, if any electronic components, such as incandescent bulbs, are incorporated into the instrument, their magnetic field will interfere with the instrument's reading.

U.S. Pat. No. 6,145,209 relates to an illumination device adapted to be mounted on a transparent bottom of a magnetic compass for illuminating a compass rose and a compass needle thereof. The light source comprises an incandescent lamp or LED affixed to a mounting plate. When the light source is activated, the lamp projects light upward through the bottom of a transparent case containing the compass rose.

U.S. Pat. No. 6,578,277 relates to a magnetic compass comprising a compass body, an illuminant, a battery set, a base, and a top lid. The compass body, the illuminant and the battery set are situated within the interior section of the base and, furthermore, the illuminant is positioned at one side of the compass body and its light is projected towards the peripheral walls of the compass body. As such, the compass body is illuminated and the magnetic compass of the present invention is effectively usable under low light conditions.

Conventional lighting sources and the electrical wiring associated with them are known to radiate electromagnetic (EM) energy. This EM energy field will affect the operation and orientation of a compass needle, thereby providing an inaccurate directional heading. Incandescent bulbs and un-insulated copper wire are notorious for emitting EM fields. Generally, the interference caused by an EM energy field radiated from a small incandescent light only produces small perturbations in the compass reading. Either of the two aforementioned compass illumination schemes may be employed in recreational compasses with a relative loss of compass accuracy which does not materially affect the casual user.

However, for certain applications, a higher degree of accuracy in compass readings is required and the interference from incandescent bulbs and wiring becomes a significant factor in compass error. While not limited to such uses, particular applications which require a high degree of compass accuracy comprise long range military operations, and outdoor adventurers. An error of a few seconds of a degree, over tens of miles, can result in significantly missing a target location.

These sophisticated compass users are also more likely than a recreational user to navigate at night or in low light conditions. One particular application of such a compass finds widespread utility in military operations where a night-readable compass is required to navigate. However flashlights and other bright, harsh, illumination sources are discouraged so as not to alert opposing forces to the presence of military personnel.

Therefore, there is a need to provide illumination to a magnetic compass or other magnetically sensitive instrument without interfering with the operation of the instrument. More particularly, there is a need to provide a source of illumination that produces little or no electromagnetic radiation. It is to this problem that the present invention is directed.

SUMMARY OF THE INVENTION

In a first aspect of the present invention, an illumination device for a magnetically sensitive instrument is provided comprising a magnetically sensitive instrument, preferably a magnetic compass needle, and an electroluminescent device comprising an electroluminescent panel positioned behind and facing the magnetically sensitive instrument such that when the electroluminescent panel is activated, the magnetically sensitive instrument is illuminates by the electroluminescent light.

An additional embodiment of the present invention further comprises a power source, preferably a battery, in communication with the electroluminescent panel to provide operating energy thereto. An electroluminescent driver circuit operable to convert direct current into alternating current may optionally be provided.

In another embodiment of the present invention, the battery, electroluminescent driver circuit, and electroluminescent panel are in electrical communication through low electromagnetic interference conduits.

In one embodiment of the present invention, the electroluminescent device comprises a thin-film electroluminescent device comprising a laminar construction. The device further comprises a transparent mounting plate, wherein the electroluminescent panel is positioned on one side of and facing the transparent mounting plate. Additionally, a compass rose may optionally be printed on the surface of the electroluminescent panel, and switching means are optionally provided to releaseably engage the power source to the EL device thereby providing power to the electroluminescent panel to illuminate the device.

In a preferred embodiment of the present invention, a luminescent device for a magnetic compass is provided comprising a housing, an electroluminescent panel comprising a light emitting face affixed within said housing a magnetically sensitive compass needle mounted in a freely rotatable manner within said housing in proximity to the face of the electroluminescent panel, and a power source in electrical communication with said electroluminescent panel wherein the connection between the power source and electroluminescent panel is engageable and interruptible through switching means.

In a second aspect of the present invention, a method for illuminating a magnetic compass needle is provided comprising providing a magnetic compass needle mounted in a freely rotatable manner, providing an electroluminescent device comprising an electroluminescent panel, a driver circuit, and a power source, behind and facing said compass needle, engaging the power source to the driver circuit to provide an appropriate energy form to the electroluminescent panel such that the electroluminescent panel emits light and illuminates the magnetic compass needle. In a preferred embodiment of the present inveinoti the power source is a battery and is engageable and disengageable to the electroluminescent device through switching means.

Features of an electroluminescent device for a magnetic compass of the present invention may be accomplished singularly, or in combination, in one or more of the embodiments of the present invention. As will be appreciated by those of ordinary skill in the art, the present invention has wide utility in a number of applications as illustrated by the variety of features and advantages discussed below.

An electroluminescent illumination device for a magnetic compass of the present invention provides numerous advantages over prior illumination device for magnetic compasses. For example, the present invention advantageously provides an illumination device that produces little heat, is thin, flexible, shock proof, and resistant to catastrophic failure. The device can be powered by a small battery, produces distributive light and is non-glaring. Furthermore, the device can be incorporated into a compass design simply and easily at a relatively low cost.

As will be realized by those of skill in the art, many different embodiments of an electroluminescent device for a magnetic compass according to the present invention are possible. Additional uses, objects, advantages, and novel features of the invention are set forth in the detailed description that follows and will become more apparent to those skilled in the art upon examination of the following or by practice of the invention.

DETAILED DESCRIPTION

The present invention provides a system and method for illuminating magnetically sensitive instruments such that the source of illumination does not interfere with the operation of the instrument. By incorporating an electroluminescent (EL) light source into the magnetically sensitive instrument, the instrument can be illuminated without significant interference with its operation.

In one embodiment of the present invention, an EL device is incorporated into a magnetically sensitive instrument to provide illumination thereof while minimizing or eliminating electromagnetic interference from the light source. The systems and methods of the present invention solve the technical problem of providing illumination to a magnetically sensitive instrument. Thus, any instrument that is magnetically sensitive will benefit from EL illumination. For the purposes of illustration and explanation, an embodiment of the present invention comprising a magnetic compass will be described and shown.

In one embodiment of the present invention, the compass comprises one of several known varieties of compasses such as hand-held, wrist, or dashboard mounted compasses. One skilled in the art will recognize the utility of the various embodiments of the present invention employed in common compass applications. The principles of the present invention discussed herein are applicable to a wide variety of compass designs, and other magnetic instrumentation, for use at night or in other low light conditions.

Figure 1:
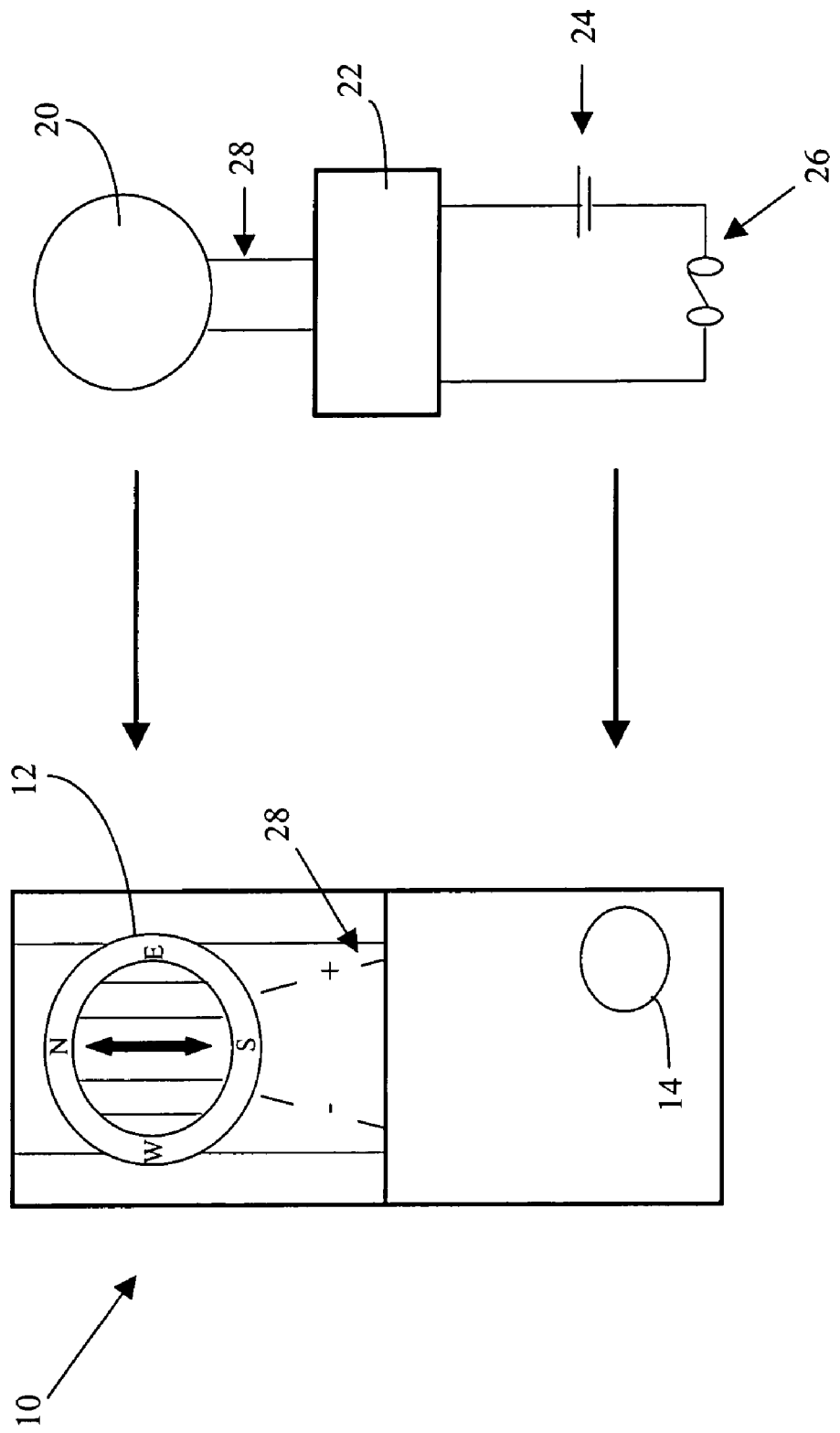
FIG. 1 is a schematic of a top view of a simplified compass design on the left side with a schematic view of the underlying circuitry on the right side in an embodiment of the present invention

A simplified diagram of a preferred embodiment of the present invention s illustrated in FIG. 1. An EL panel 20, powered by a battery 24, through an EL driver circuit 22 provides illumination. A switch 26 is provided to allow a user to engage the battery 24 to the EL driver and illuminate the EL panel. A compass needle 12 is positioned above the EL panel and is free to rotate. This configuration provides backlight illumination to the compass needle enabling the needle to stand out against the backlight for enhanced readability. An observer, viewing the compass in a low light environment, will be able to clearly see the needle 12 against the illuminated background of the EL panel.

In one embodiment of the present invention, the EL device comprises a relatively thin, flat EL panel that is applied to the underside of a transparent mounting plate. The compass needle is mounted to the top side of the mounting plate. Illumination emitted from the EL device passes through the transparent mounting plate and backlights the magnetic needle. The compass and EL device are preferably constructed within a housing to protect the components. In a most preferred embodiment of the present invention, the housing comprises a non-metallic material to prevent further disruption of the compass needle.

Electroluminescence is a non-thermal light emitting process resulting from the application of an electric field to a solid organic material. An example of a simple EL device is an alternating current thin-film electroluminescent (ACT-FEL) device comprising a metal-insulator-semiconductor-insulator-metal (MISIM) configuration. By sandwiching a phosphor, such as ZnS:Mn between two insulators, with a clear electrode on a front side to allow light to pass and a metal electrode backing, light is emitted from the phosphor when an electrical current is passed through the device. The electric field excites high-energy electrons in the phosphor where they subsequently lose energy and emit photons.

Figure 2:
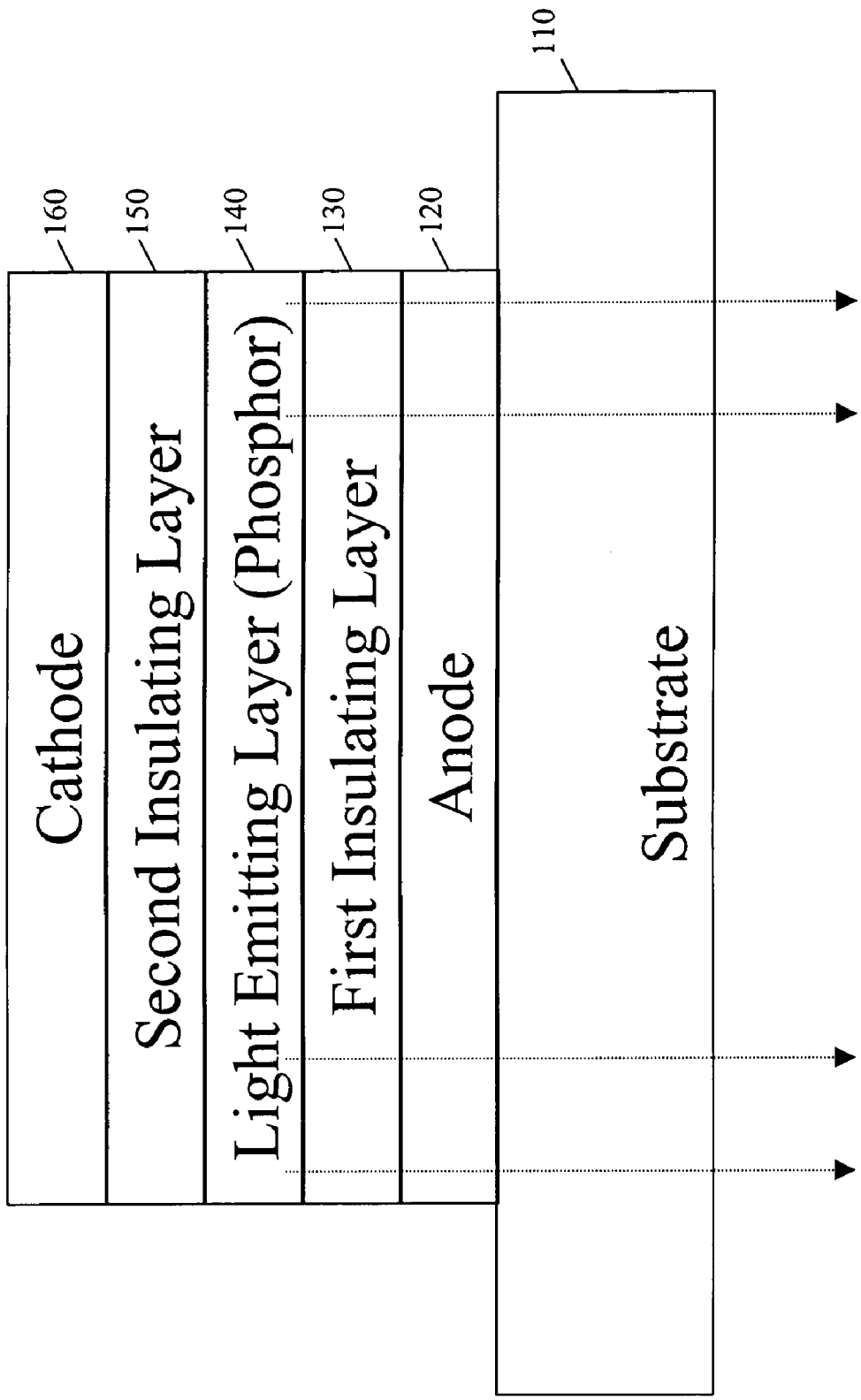
FIG. 2 is a block diagram of an electroluminescent device in an embodiment of the present invention.

FIG. 2 illustrates a basic MISIM configuration for a EL device. This EL device comprises a transparent substrate 110, a transparent anode 120, a first insulative layer 130, a light emitting phosphor layer 140, a second insulative layer 150, and a cathode 160. The substrate 110 preferably comprises a flexible transparent material, such as MYLAR to allow the EL device to be constructed as a thin, lightweight, flexible sheet. The substrate also provides protection to the transparent electrode to prevent physical damage from scratching, moisture, or corrosion.

The electrodes comprise an anode 120 and a cathode 160. The anode 120 is commonly manufactured from indium tin oxide (ITO), however any transparent anodic material is suitable. The cathode 160 commonly comprises a metallic cathode, for example lithium group cathodes such as LiF or Al:Li, or an Aluminum cathode such as CsAl or MgAl.

The intermediate insulative layers 130 and 160 preferably comprise a transparent dielectric material. Insulating layers 130 and 150 are commonly constructed of yttrium oxide, silicon dioxide, aluminum oxide, silicon nitride or the like.

The phosphor material 140 can be any of the well known materials used in EL devices. The phosphor material 140 may be selected based on the desired color, brightness, etc, of the finished product. For example, a ZnS:Mn phosphor emits a yellow light.

Figure 3:
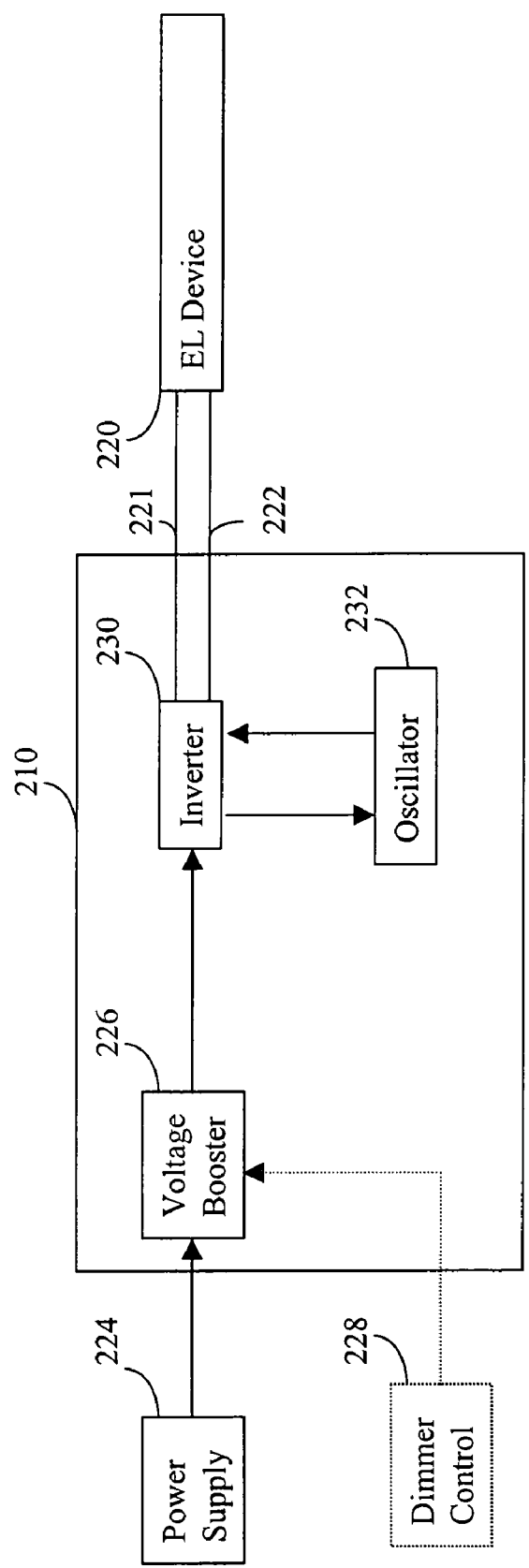
FIG. 3 is a flowchart of an electroluminescent device with driver circuitry and a power source in an embodiment of the present invention.

When an AC excitation voltage is applied to the two electrodes of the EL device, an alternating electric field excites electrons of the atoms within the phosphorous layer to higher energy levels. When the electrons return to their ground state, they emit light. This light passes through the transparent insulative layer, the transparent anode, the transparent substrate, and finally into the surrounding environment. The dashed arrows in FIG. 3 illustrate the path of light through the device.

For the purposes of the present invention, the primary advantages of using an EL device to illuminate a magnetic compass needle include providing illumination without using much current and without producing any substantial electromagnetic radiation. EL laminate panels may also be constructed to be very thin and flexible. For example, commercially available thin-film EL devices can be manufactured to thickness of less than 0.008 inches. Further, these EL panels will accept printing of designs or, for the purposes of the present invention, a compass rose.

EL devices have long life-spans because the phosphor and insulators wear out slowly, over a long period of time. Catastrophic failure, such as a filament burning out in an incandescent light, rarely occurs in an EL device. The EL device will slowly grow dimmer with age. Most importantly for the purposes of the present invention, an EL light does not radiate any significant electromagnetic field, and therefore will not interfere with the instruments magnetic properties.

In a preferred embodiment of the present invention, the power source for the EL device comprises a battery. The preferred batteries for use in the present invention are lightweight, compact, and have an extended life. A thin cell battery, such as the Ultralife Thin Cell® battery, manufactured by Ultralife Batteries, Inc, Newark, N.Y., is a wafer-thin lithium battery. These batteries can be made as thin as 0.078 inches (2.0 mm) and provide high energy over a wide temperature range while providing extended shelf life and light weight. These batteries generally provide 1.5 to 6 volts and weight 2 to 15 grams. Other power sources, such as a Lithium/Magnesium Oxide ultra-long life battery, are also preferable for use with the present invention. The battery for use in a particular embodiment of the present invention can be selected based on cost, useful life, weight, and overall product design considerations.

Though a battery is the preferred means for powering the EL device, AC voltage is required to power EL devices. Therefore, the required AC voltage must be generated from the low voltage DC battery. This is accomplished through a chip inverter, or EL driver circuit.

The EL driver circuit received power from the power source, preferably a battery. The driver is necessary to convert the low current DC power source to an AC sine wave which is the preferred current form for EL devices. Most EL lamps require a driving source with an amplitude of 10 to 200 volts peak to peak and a frequency of between 100 Hz and 1 kHz. The brightness of the EL light depends upon the materials and configuration of the EL laminate, as well as the amount of power used. Generally, luminosity increases with frequency of the sine wave; however, this has an inverse impact on the efficiency of the device.

In a preferred embodiment of the present invention, the EL driver is selected from a commercially made EL driver manufacturer. For example, EL drivers and EL lamps are available through BKL Inc., Burr Ridge, Ill. A simplified schematic of a typical driver circuit is shown in FIG. 3. A battery 224 supplies power to a voltage booster 226 which raises the voltage from the 1.5 to 6 volts supplied by the battery 224 to a typical EL voltage of 40–90 DC volts. A dimming control 228 or other signal conditioning/regulating control may also be provided. The signal leaving the voltage booster 226 enters the inverter 230 which converts the high voltage DC signal into an AC waveform. An oscillator 232 controls the frequency of the AC waveform, and finally the signal is sent to the EL device 220 via two electrodes 221 and 222.

Even though EL panels do not emit any substantial electromagnetic radiation and use little power, the power supply, including wiring to the EL device, may produce undesirable electromagnetic radiation. Therefore, the EL driver 22 and wiring 28 to the EL panel 20 preferably comprise low electromagnetic interference (EMI) components to minimize the amount of electromagnetic radiation produced by the system. Additionally, an electromagnetic shield to further protect the sensitivity of the compass needle may optionally be provided between the battery/driver circuitry and the EL device/compass needle.

Although the present invention has been described with reference to particular embodiments, it should be recognized that these embodiments are merely illustrative of the principles of the present invention. Those of ordinary skill in the art will appreciate that the apparatus and methods of the present invention may be constructed and implemented in other ways and embodiments. Accordingly, the description herein should not be read as limiting the present invention, as other embodiments also fall within the scope of the present invention.

What is claimed is:

1. An illumination device for a magnetically sensitive instrument comprising:
    a magnetically sensitive instrument; and,
    an electroluminescent device comprising a power source, an electroluminescent driver circuit operable to convert direct current into alternating current, and an electroluminescent panel positioned behind and facing the magnetically sensitive instrument such that when the electroluminescent panel is activated, the magnetically sensitive instrument is illuminated by the electroluminescent light,
    wherein the power source, electroluminescent driver circuit, and electroluminescent panel are in electrical communication through low electromagnetic interference conduits.

2. The illumination device of claim 1, wherein the power source is a battery.

3. The illumination device of claim 1, wherein the magnetically sensitive instrument comprises a compass needle.

4. The illumination device of claim 1, wherein the electroluminescent device comprises a thin-film electroluminescent device comprising a laminar construction.

5. The illumination device of claim 4, further comprising a transparent mounting plate, and wherein the electroluminescent panel is positioned on one side of and facing the transparent mounting plate.

6. The illumination device of claim 4, wherein a compass rose is printed on the surface of the electroluminescent panel.

7. The illumination device of claim 1, further comprising switching means to releaseably engage the power source to the EL device thereby providing power to the electroluminescent panel to illuminate the device.

8. A luminescent device for a magnetic compass comprising:
    a housing;
    an electroluminescent panel comprising a light emitting face affixed within said housing;
    a magnetically sensitive compass needle mounted in a freely rotatable manner within said housing in proximity to the face of the electroluminescent panel; and
    a power source in electrical communication with said electroluminescent panel wherein the connection between the power source and electroluminescent panel is engageable and interruptible through switching means;
    wherein the power source and electroluminescent panel are in electrical communication through low electromagnetic interference conduits.

9. A method for illuminating a magnetic compass needle comprising:
    providing a magnetic compass needle mounted in a freely rotatable manner;
    providing an electroluminescent device comprising an electroluminescent panel, a driver circuit, and a power source, behind and facing said compass needle; and,
    engaging the power source to the driver circuit to provide an appropriate energy form to the electroluminescent panel such that the electroluminescent panel emits light and illuminates the magnetic compass needle;
    wherein the power source, electroluminescent driver circuit, and electroluminescent panel are in electrical communication through low electromagnetic interference conduits.

10. The method of claim 9, wherein the power source is a battery.

11. The method of claim 10, wherein the power source is engageable and disengageable to the electroluminescent device through switching means.

* * * * *